Figures 3, 4:
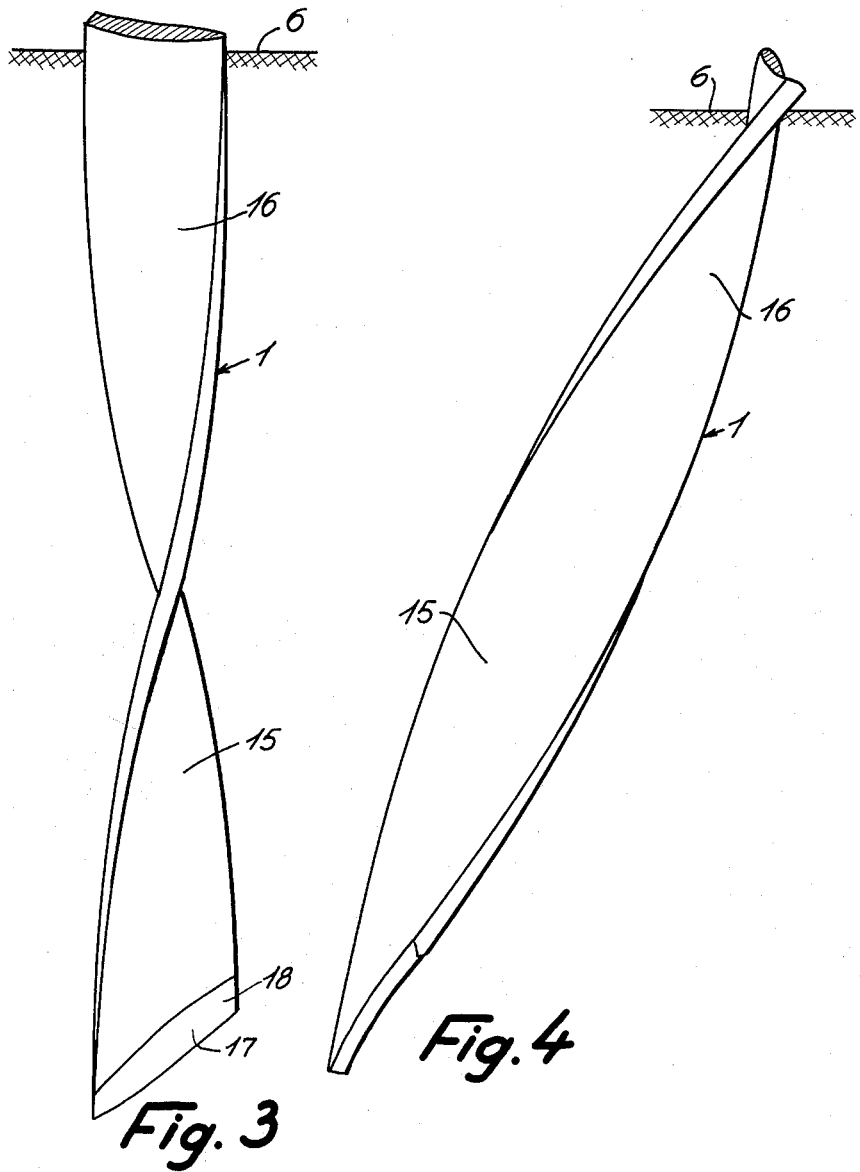

Aug. 17, 1965  K. O. ANDERSEN  3,200,892
HARROW TOOTH
Filed April 13, 1964  2 Sheets-Sheet 1
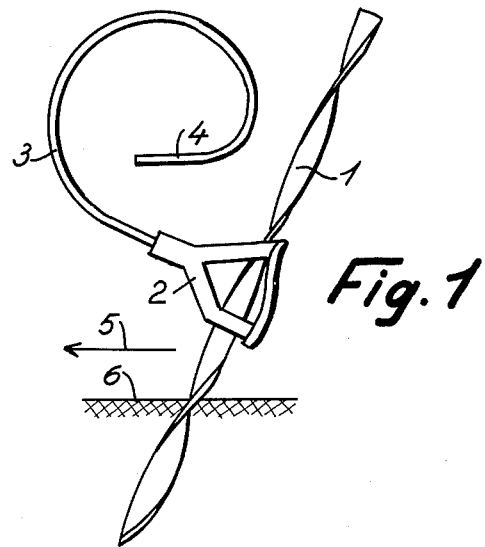
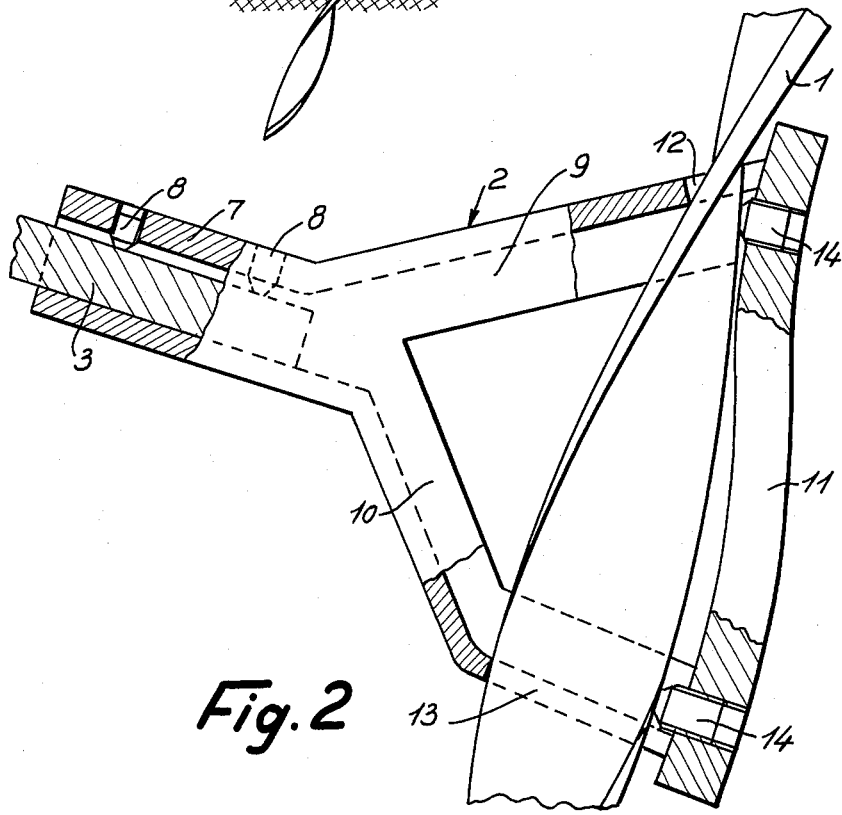
INVENTOR.
Kaj O. Andersen
BY Watson, Cole, Grindle & Watson
ATTORNEYS Aug. 17, 1965    K. O. ANDERSEN    3,200,892
HARROW TOOTH Filed April 13, 1964    2 Sheets-Sheet 2

INVENTOR.
Kaj O. Andersen
BY Watson, Cole, Grindle & Watson
ATTORNEYS 3,200,892
HARROW TOOTH
Kaj Otto Andersen, Skaelskorvej, Slagelse, Denmark
Filed Apr. 13, 1964, Ser. No. 359,305
Claims priority, application Denmark, Apr. 25, 1963,
1,928/63
3 Claims. (Cl. 172—713)

This invention relates to a harrow tooth, particularly for use in a harrowing operation immediately preceding sowing or planting.

As is well-known, the purpose of harrowing the soil is to till, i.e. to loosen or break up the earth in order to make it more fit for cultivation. A by-effect of the harrowing operation is that the earth is more exposed to the atmosphere than it was before harrowing. This may result in undesirable drying of the earth.

It is the object of the invention to devise a harrow tooth which, while being capable of efficiently loosening or breaking up the earth, will reduce the tendency towards drying of the soil as compared with previously known harrow teeth.

With this object in view, according to the invention, a harrow tooth is provided which comprises an earth-engaging portion consisting of a length of flat bar which is twisted about its longitudinal axis through an angle of approximately 180°.

As will be explained more fully below, this novel configuration of the harrow tooth has the effect of reducing the tendency of the deeper layers to be lifted up to the surface of the soil under the influence of the ploughing effect of the harrow tooth so that the moisture of the earth, which is usually higher in the deeper layers than in the upper layers, is less exposed to dissipation into the atmosphere by evaporation than would otherwise be the case.

The invention also relates to suitable means for holding the harrow tooth in correct working position and for readjusting the harrow tooth when it has become worn, so as always to maintain optimum working conditions.

The invention will now be described in further detail with reference to the accompanying drawings in which:

FIG. 1 illustrates one form of a harrow tooth according to the invention in side view, as mounted in a holder with a suspension spring, FIG. 2 on a larger scale the holder and the portion of the harrow tooth clamped therein, in side view and partly in section, FIG. 3 likewise on an enlarged scale, the lower portion of a harrow tooth in working position, as seen in front view, and FIG. 4 the lower portion of the harrow tooth in working position, as seen in side view.

In the drawing, 1 is a harrow tooth according to the invention which, as illustrated in FIGS. 1 and 2, is clamped in a holder 2 attached to one end of an approximately spiral-shaped suspension spring 3 the other end 4 of which is arranged for attachment to a transverse bar of a harrow frame in such a manner that the tooth 1 will be directed forwards and downwards at an inclination in the direction of travel of the harrow, which is marked by an arrow 5. 6 is the surface of the soil in which the tooth 1 is engaged.

As illustrated in FIG. 2, the holder 2 comprises a sleeve portion 7 of rectangular cross section in which the lower end of the spring 3 is received and clamped by means of two screws 8. At the end facing away from the sleeve 7, the spring 3 is forked to form two branches of channel section having their bottoms facing away from one another. The upper branch is denoted by the reference character 9, and the lower branch by the reference character 10. The ends of the branches are connected with each other by means of a curved flat bar 11. A transverse slot 12 is provided in the upwardly facing bottom of the channel section branch 9, and a longitudinal slot is provided in the downwardly facing bottom of the channel section branch 10. Two clamping screws 14 are engaged in holes of the flat bar 11.

The tooth 1 is twisted about its longitudinal axis and in the embodiment illustrated, the pitch of the twisting is such that a full convolution of 360° corresponds to a length of tooth of approximately 40 cm. Thus one-quarter of a convolution corresponds to a length of approximately 10 cm., and the slots 12 and 13 are arranged at this mutual spacing. This means that the tooth 1, which is uniformly twisted on the whole of its length, can be passed through the two slots 12 and 13 which are substantially perpendicular to one another. After the tooth 1 has been passed through the holder to a suitable extent, the screws 14 are tightened. By a suitable extent is to be understood a distance such that approximately the lowermost half convolution of the tooth will engage into the earth with one of the long sides of the cross section of the tooth facing forwards at the lowermost end of the tooth. When the tooth has been adjusted in this manner, it assumes the position illustrated in front view in FIG. 3 and in side view in FIG. 4 as seen from the left hand side in FIG. 3.

During travel of the tooth in the direction 5, the lowermost quarter of a convolution 15 will act approximately like a plough share to break up and loosen the lower layers of earth while at the same time producing a slight upward movement of the earth, but this upward movement will be interrupted at the transition between the lowermost quarter of a convolution 15 and the next following quarter of a convolution 16 seeing that in this zone the earth will pass along the flat sides of the cross section of the tooth. The degree of tilling will then again increase along the upper quarter of a convolution 16 up to the surface of the soil 6.

Consequently, the lower layers of earth, while being efficiently loosened or broken up, will nevertheless tend to remain at the lower level instead of being abundantly hurled up to the upper surface of the soil, as is the case with harrow teeth of conventional design. The lower layers of earth will therefore keep their moisture content correspondingly better.

When the lower end of the harrow tooth has become worn so that the earth engaging portion has become correspondingly shorter, the tooth may be readjusted simply by loosening the screws 14, pushing the tooth forwards in the slots 12 and 13 until the length of tooth extending below the holder is the same as before, and then again tightening the screws 14. The harrow tooth will then again assume the optimum working position above described because the tooth, while being pushed forward, will at the same time automatically be correspondingly rotated about its longitudinal axis owing to its engagement with the slots 12 and 13. The same effect would of course be obtained if the spacing of the two slots 12 and 13 were different provided only that the angle between the slots 12 and 13 were then also differently selected, viz., such that the angle would correspond to the angle of twist of a length of bar equal to the spacing of the slots.

The lower end of the tooth is cut off at an inclination as indicated at 17 and is slightly sharpened. By experiments it has been found that this shape is not substantially distorted by wear. The reason for this is that owing to the inclination of the lower edge of the tooth, the tip of the tooth will face forwards in the direction of travel and the earth will therefore slide from this tip along the forwardly facing flat side so that the strongest wear will occur at the corner 18 of the lower end of the tooth located to the right in FIG. 3 whereby the inclined cutting edge is preserved.

I claim:

1. A harrow tooth comprising an elongated flat bar twisted about its longitudinal axis at a constant pitch and including an earth engaging portion of a length corresponding to an angle of twist of approximately 180°, and a holding portion twisted at the same pitch as said earth engaging portion and forming a direct continuation of said earth engaging portion at one end thereof.

2. In combinatiton with a harrow tooth as defined in claim 1, a harrow tooth holder for said harrow tooth, said holder comprising spaced holding elements having slots for the passage of said flat twisted bar, said slots being positioned at an angle to each other corresponding to the angle of twist of a length of bar equal to the spacing of said holding elements, and means for clamping said twisted bar in said slots.

3. In combination with a harrow tooth as defined in claim 1, a harrow tooth holder for said harrow tooth, said holder comprising a holding element having slots for the passage of said flat twisted bar, said holding elements being spaced at approximately one quarter of the pitch of said twisted bar, said slots being approximately perpendicular to one another, and means for clamping said twisted bar in said slots.

References Cited by the Examiner

FOREIGN PATENTS 1,069,374   7/54   France.
256,934   10/11   Germany.

ABRAHAM G. STONE, *Primary Examiner.*

T. GRAHAM CRAVER, A. F. GUIDA, *Examiners.*